(12) United States Patent
Streuer et al.

(10) Patent No.: US 8,945,742 B2
(45) Date of Patent: Feb. 3, 2015

(54) VALVE PLUG

(75) Inventors: Peter Streuer, Hannover (DE); Ingo Koch, Hameln (DE); Thorsten Werle, Burgdorf (DE); Eberhard Meissner, Wunstorf (DE)

(73) Assignee: Johnson Controls Autobatterie GmbH & Co., Hannover (DE)

( * ) Notice: Subject to any disclaimer, the term of this patent is extended or adjusted under 35 U.S.C. 154(b) by 117 days.

(21) Appl. No.: 13/496,467

(22) PCT Filed: Jul. 28, 2010

(86) PCT No.: PCT/EP2010/004618
§ 371 (c)(1),
(2), (4) Date: Mar. 15, 2012

(87) PCT Pub. No.: WO2011/032617
PCT Pub. Date: Mar. 24, 2011

(65) Prior Publication Data
US 2012/0177962 A1    Jul. 12, 2012

(30) Foreign Application Priority Data
Sep. 16, 2009 (DE) .................. 10 2009 041 417

(51) Int. Cl.
H01M 2/12 (2006.01)
H01M 2/36 (2006.01)
H01M 10/06 (2006.01)

(52) U.S. Cl.
CPC ............ H01M 2/362 (2013.01); H01M 2/1229 (2013.01); H01M 10/06 (2013.01); Y02E 60/126 (2013.01)
USPC .......................................................... 429/89

(58) Field of Classification Search
None
See application file for complete search history.

(56) References Cited

U.S. PATENT DOCUMENTS 6,491,176 B1 * 12/2002 Schollenberger et al. .... 215/307
6,844,104 B2    1/2005 Cramer et al.

FOREIGN PATENT DOCUMENTS

| CN | 101507034 A | 8/2009 |
|---|---|---|
| DE | 297 14 031 U1 | 10/1997 |
| DE | 10 2007 061 784 A1 | 12/2007 |
| EP | 1 211 738 B1 | 11/2000 |
| WO | WO 01/82395 A1 | 11/2001 |

OTHER PUBLICATIONS

International Search Report dated Oct. 12, 2010, PCT/EP2010/00461, filed Jul. 28, 2010

* cited by examiner

*Primary Examiner* — Patrick Ryan
*Assistant Examiner* — Wyatt McConnell
(74) *Attorney, Agent, or Firm* — Boardman & Clark LLP

(57) ABSTRACT

The invention relates to a sealing plug arrangement (1, 2) for a battery, wherein the sealing plug arrangement comprises at least one plug part (1) and a plug retainer (2), and the plug retainer (2) has a hollow area (4) for accommodating at least one retaining section of the plug part (1), wherein the plug part (1) is designed to seal off at least one interior (73, 74) of the battery from the environment when the plug part is installed in the hollow area (4) of the plug retainer (2). Proceeding from this, an improved sealing plug arrangement is specified that can be realized at low cost and that is reliable. For this purpose, the plug retainer (2) comprises at least one flow channel (6) on the inside of the plug retainer in the hollow area (4), which flow channel extends at least along the area in which the plug part (1) is retained in the plug retainer (2) when the plug part is installed in the hollow area (4).

14 Claims, 5 Drawing Sheets

Figure 4:
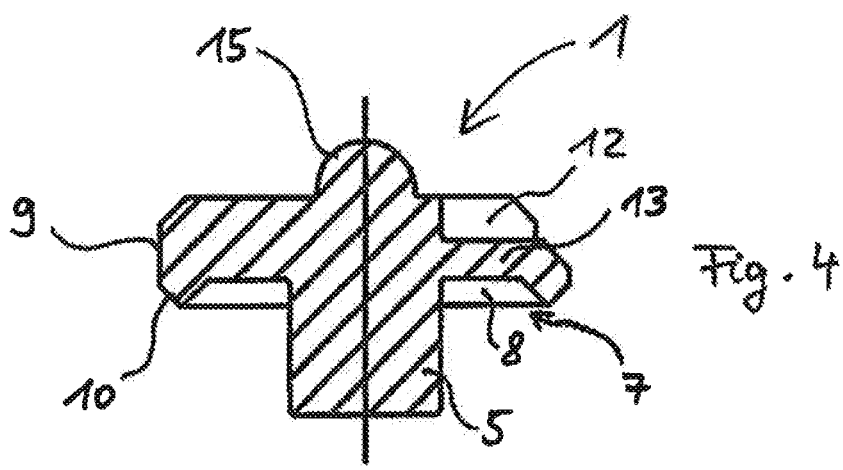

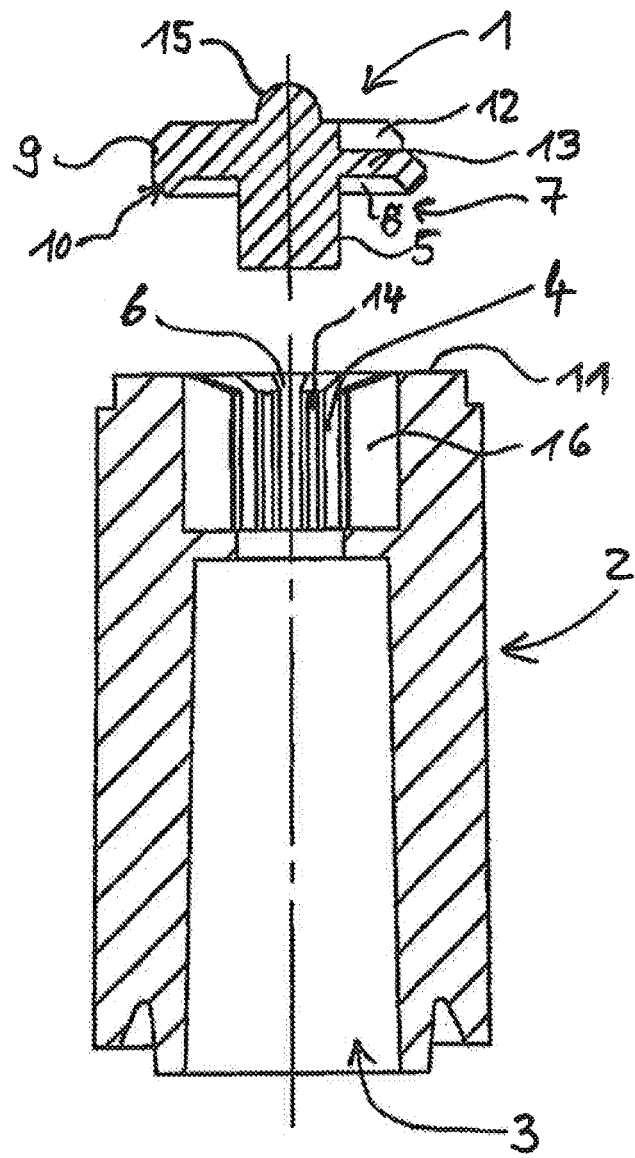
Fig. 1
Fig. 2
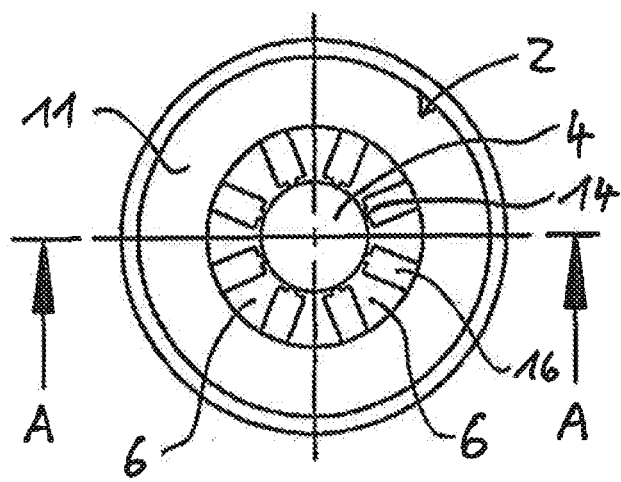
Fig. 3

VALVE PLUG

The invention relates to a sealing plug arrangement for a rechargeable battery as claimed in the preamble of patent claim 1 and also to a rechargeable battery having a sealing plug arrangement of this kind.

Sealing plug arrangements of this kind are used, for example, in rechargeable battery technology, for example for closing housing openings of lead-acid batteries for motor vehicles. The housing of the rechargeable battery generally has a housing space which is subdivided into several chambers and in which liquid in the form of acid, which is used as an electrolyte, is provided. Depending on the design of the rechargeable battery, the liquid can be absorbed in a nonwoven material and bound to it. At least one housing opening in the form of a filling opening is provided for filling the housing with acid. For the purpose of practical operation of the rechargeable battery, it has to be possible to close the housing opening in a sealed manner in order to prevent acid undesirably escaping and to maintain a certain—even if low—overpressure in the rechargeable battery housing. In order to protect the rechargeable battery from an undesirably high overpressure in the housing interior, it is customary to provide an overpressure prevention means which allows gas to be discharged from the housing, for example via the filling opening, when the pressure is too high.

In known housings, a sealing plug arrangement is provided for the purpose of sealing off the housing opening, said sealing plug arrangement having a plug part and a plug holder. The prior art makes various proposals for sealing plug arrangements of this kind, for example DE 10 2007 061 784 A1, EP 1 001 905 B1 or EP 1 211 738 B1.

The invention is based on the object of specifying an improved sealing plug arrangement which can be realized in a cost-effective manner and is reliable.

This object is achieved by the invention specified in patent claim 1. Advantageous developments of the invention are specified in the dependent claims.

The invention has the advantage that the elements which are required for reliable functioning of the overpressure prevention means can be separated from one another. Known solutions, for example EP 1 001 905 B1, propose a valve plug in which all the elements of the overpressure prevention means are provided in one component, specifically in the plug part. The need to optimize firstly the flow cross section which provides out flowing gas, and secondly the parameters which influence the response pressure at which the overpressure prevention means opens and allows gas to flow out, for the purpose of reliable functioning of the overpressure prevention means were identified in the present invention. The parameters which influence the response pressure are, for example, the material elasticity of the plug part, which is determined, amongst other things, by the shaping in the overpressure prevention region, and the effective area for the generated gas pressure. By virtue of the present invention, the flow channel for emerging gas is provided at least partly in the plug holder, while further parameters, which influence the response pressure, are associated with the plug part.

On account of the separation of the influencing variables achieved as a result, it is possible to in each case optimize the individual parameters of the overpressure prevention function without having a negative influence on the respectively other parameters. For example, the flow cross section can be optimized by appropriate configuration of the flow channel which is provided in the plug holder, without changing the shaping and therefore the material elasticity of the plug part. In the plug part, the material elasticity in the overpressure prevention region can be selected as desired by appropriate shaping, for example by providing a cutout on the plug part on that face which is not subjected to the action of the gas pressure, and therefore the response pressure can be optimized at the desired value. This optimization, for its part, does not influence the flow cross section, that is to say is separate from the optimization of the flow cross section.

In addition to the overpressure prevention function, the sealing plug arrangement according to the invention also has a sealing function. The sealing function seals off an interior of the rechargeable battery from the surrounding area, for example the atmosphere, in a pressure range below the response pressure. The sealing function can advantageously also be optimized independently. As a result, this invention can specify a sealing plug arrangement which operates reliably both in respect of the sealing function and in respect of the overpressure prevention function, and in which both the plug part and the plug holder can be produced in a simple and low-cost manner.

The response pressure of the overpressure prevention function is advantageously approximately 75 mbar. Sealing off by the sealing plug arrangement according to the invention is also ensured when there is a negative pressure in the interior of the rechargeable battery.

According to the invention, the plug holder has at least one flow channel on its inner face in a hollow region. The flow channel is advantageously operatively connected to the overpressure prevention region, for example on account of the flow channel extending as far as an overpressure prevention region. Therefore, an element which is associated with the overpressure prevention function is associated with the plug holder and therefore no longer has to be provided in the plug part. The plug part can therefore be produced in a homogeneous manner in the region of a holding section in which the plug part is held in the plug holder when said plug part is fitted in the hollow region, and does not have to be provided with a flow channel in this region. The flow channel which is provided on the inner face of the plug holder allows gas which is at an excessively high overpressure to be let out via the overpressure prevention region. The overpressure prevention region is understood to be that region of the sealing plug arrangement which serves for overpressure prevention, for example the region in which the gas pressure is produced. Depending on the configuration, this can be a physically expanded region of the sealing plug arrangement or a relatively small point with a low level of physical expansion. The overpressure prevention region can contain, in particular, a valve point at which gas is discharged when the response pressure is exceeded.

According to one advantageous development of the invention, the plug part has a collar which forms a stop when the plug part is inserted into the plug holder. This advantageously allows simple insertion of the plug part into the plug holder, it being possible to correctly position the plug part with little effort. The collar can be arranged, for example, to fully surround a central section of the plug part and in this way ensure that the housing opening is sealed off.

According to one advantageous development of the invention, the collar has a sealing bead which faces in the direction of the plug holder when the plug part is inserted into the plug holder. The intention is for the sealing bead to butt against a sealing surface of the plug holder. The sealing bead can advantageously provide an arrangement for sealing off the housing opening which is simple to produce and provides effective sealing. A portion of the collar or a portion of the sealing bead can advantageously be a constituent part of the overpressure prevention region.

According to one advantageous development of the invention, the plug part has a cutout on its face which is averted from the holding section in the region of the overpressure prevention region. The cutout weakens the material of the plug part in the region of the overpressure prevention region, as a result of which said plug part can deform more easily. This ensures that the overpressure prevention means opens in a defined manner when at a prespecified overpressure. The cutout can advantageously be produced directly when the plug part is produced by appropriate shaping of the material, for example by suitable shaping during vulcanization. As an alternative, the cutout can be made in a further processing step by removing material from the plug part, for example using a machining method. The provision of the cutout on that face which is averted from the holding section, that is to say on the face at which the gas pressure is not produced, has the advantage that the shaping and size of the cutout do not influence the flow cross section for emerging gas when the overpressure prevention means responds. As a result, the overpressure prevention function, in respect of the response pressure, can be adapted in a simple and deliberate manner by means of the shaping and size of the cutout to meet the existing requirements.

According to one advantageous development of the invention, the cutout has a substantially linear contour or a contour which is substantially in the form of part of a circle when the plug part is viewed from above. This allows simple production of the cutout.

According to one advantageous development of the invention, the plug part has a point of increased flexibility in the region of the overpressure prevention region. Depending on the configuration of the plug part, the point of increased flexibility can be provided in addition or as an alternative to the above-described cutout. The point of increased flexibility allows the parameters for the overpressure prevention function to be precisely provided as desired, for example the opening pressure or the opening cross section as a function of the overpressure. The point of increased flexibility can be realized, for example, by providing a weakened area in the plug material.

According to one advantageous development of the invention, the plug part is composed at least partly of elastomeric material. In this case, elastomeric material is advantageously used particularly in the overpressure prevention region. In this way, overpressure prevention can be provided with a low level of complexity in respect of manufacture, in particular without additional joints or hinges.

According to one advantageous development of the invention, the plug holder has a plurality of flow channels on its inner face in the hollow region. The flow channels can advantageously be distributed approximately uniformly over the inside circumference of the plug holder. This has the advantage that the flow cross section for the overpressure prevention means is relatively large.

According to one advantageous development of the invention, the effective inside diameter of the hollow region of the plug holder is larger—at least slightly larger—than the outside diameter of the holding section of the plug part. As a result, the plug part is held in the plug holder with some play, this permitting a certain relative movement between the holding section and the plug holder. When there is a high gas pressure in the interior of the rechargeable battery, specifically a certain compression of the upper region of the plug part, that is to say of the plug part region, which is provided outside the hollow region of the plug holder, takes place, and therefore the holding section shifts slightly upward in relation to the plug holder. The play allows the plug part to expand again and return to its original position after a reduction in the gas pressure. Renewed sealing by the plug part or the sealing bead can be ensured in a defined manner as a result of this.

According to one advantageous development of the invention, the plug holder has protruding centering elements, which are arranged on ribs which are formed between the flow channels, in the hollow region. The centering elements are therefore arranged on the other side of the flow channel or the flow channels, for example between two flow channels. The centering elements advantageously allow reliable centering of the plug part in the plug holder, with the inside diameter, which is defined by the centering elements, being selected to be somewhat larger than the outside diameter of the holding section of the plug part. As a result, the plug part is held in the plug holder with the above-described play, this permitting a certain relative movement between the holding section and the centering elements.

The centering elements can advantageously be designed as guide ribs which run in the longitudinal direction of the ribs which are formed between the flow channels. As a result, approximately linear contact can be established between the plug part and the plug holder, this allowing the plug part to slide easily when it is inserted into the plug holder and, in particular, preventing trapping during insertion.

According to one advantageous development of the invention, a mating bearing device is provided, said mating bearing device fixing the plug part in its position relative to the plug holder in the axial direction in the state in which said plug part is mounted on the plug holder. The plug part can advantageously be held, as it were, from its rear face by a mating bearing device of this kind, while it rests against the plug accommodation part on the opposite side and is held, so that, apart from the above-described permitted relative movement between the holding section and the plug holder, relatively large movements in the axial direction are prevented. The mating bearing device can be integrated, for example, in the top cover of a rechargeable battery cover.

According to one advantageous development of the invention, a plug accommodation element is provided, said plug accommodation element having an inner chamber for accommodating the plug part and the plug holder. The plug accommodation element is provided with a holding means in order to be fastened to the housing. The holding means can be designed, for example, as a snap-action fastening means or a thread by means of which the plug accommodation element is screwed into the housing. The plug accommodation element advantageously allows the plug part to be fitted at the desired point in the plug holder in a simple and reliable manner.

According to one advantageous development of the invention, the plug accommodation element has the mating bearing device. The mating bearing device can be produced, for example, integrally with the plug accommodation element. This allows cost-effective production and simple fitting of the sealing plug arrangement in the rechargeable battery.

According to one advantageous development of the invention, a rechargeable battery has a housing of the above-described type.

The invention will be explained in greater detail in the text which follows with reference to exemplary embodiments using drawings in which:

FIG. 1—shows a plug part and

FIG. 2—shows a lateral cross-sectional view of a plug holder, and

FIG. 3—shows a plan view of the plug holder according to FIG. 2, and

FIG. 4—shows a lateral cross-sectional view of a plug part, and

Figure 5:
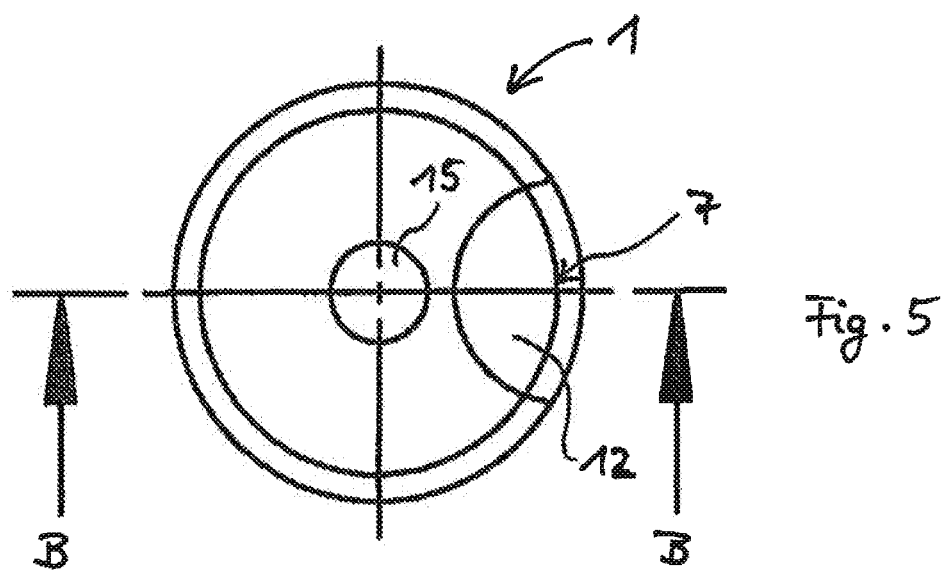

FIG. 5—shows a plan view of the plug part according to FIG. 4, and

Figure 6:
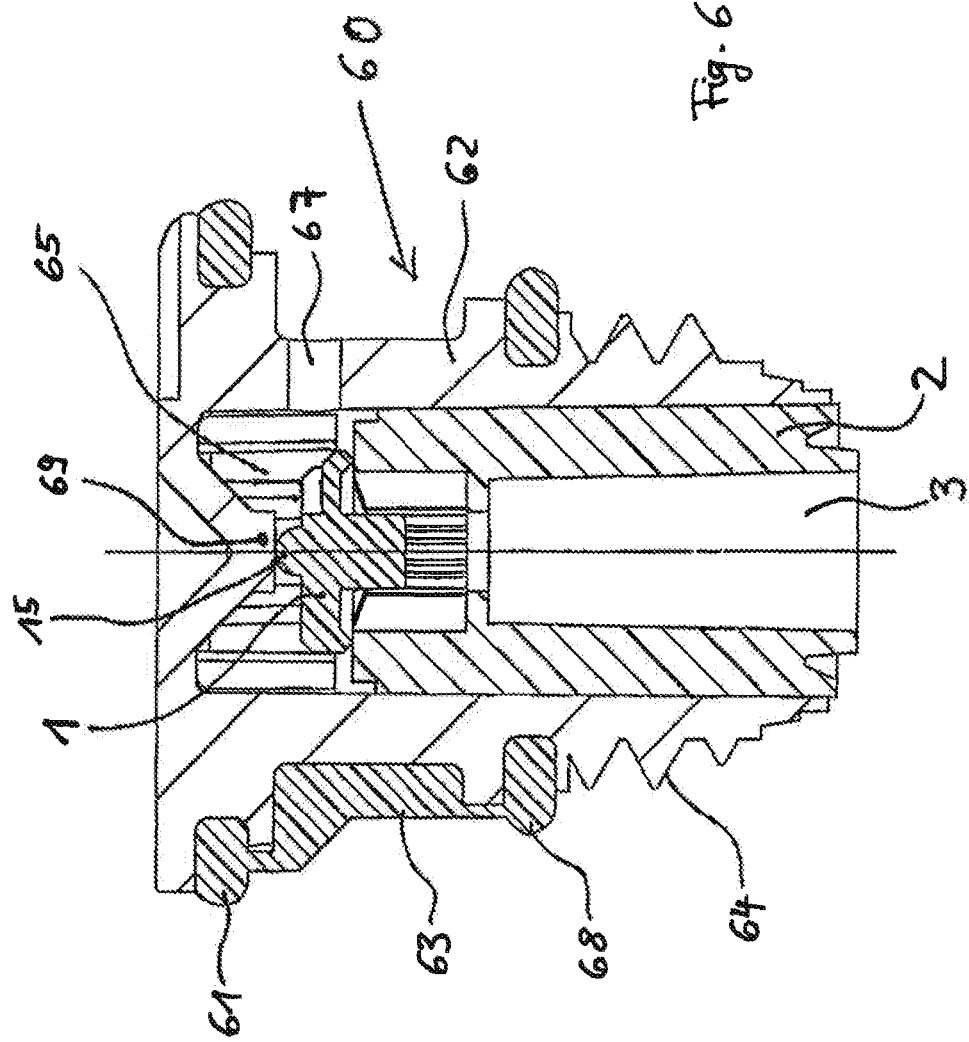

FIG. 6—shows an arrangement having a plug accommodation element, and

Figure 7:
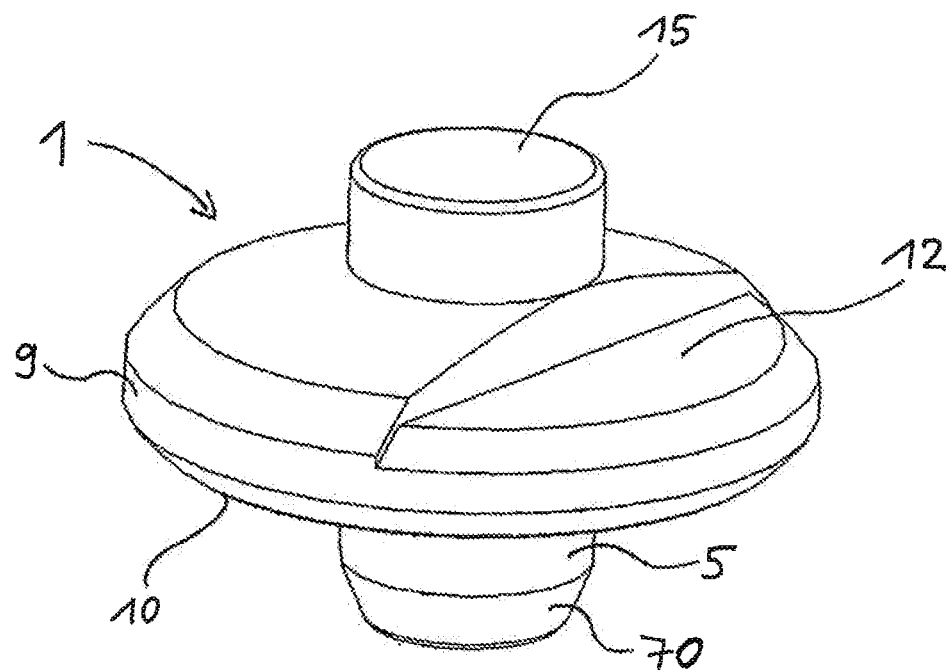

FIG. 7—shows a perspective view of a plug part, and

Figure 8:
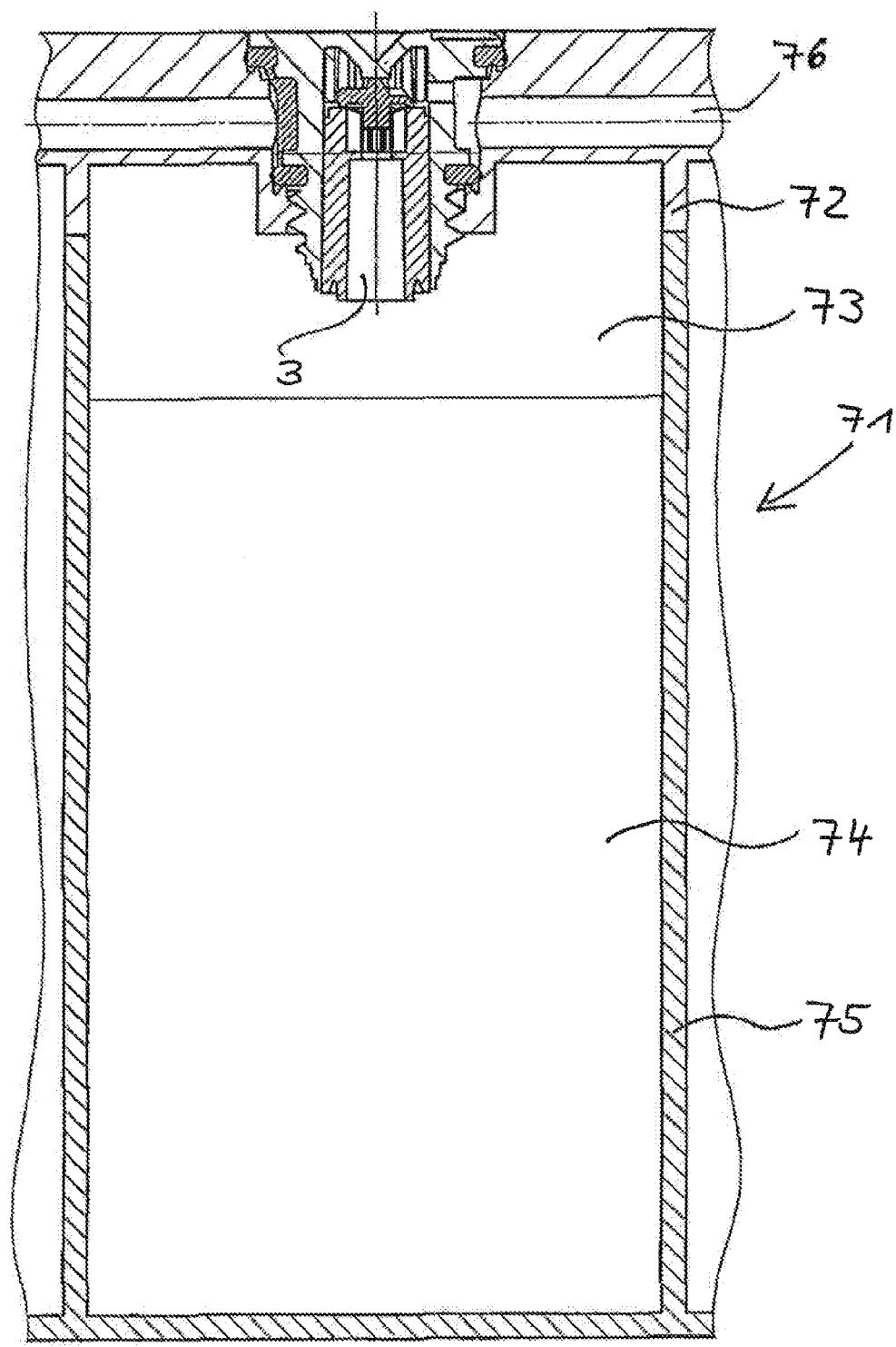

FIG. 8—shows a rechargeable battery cell having a sealing plug arrangement.

In the figures, identical reference symbols are used for elements which correspond to one another.

In the text which follows, reference is first of all made to FIGS. 1 to 3 together. In this case, FIG. 2 shows a lateral cross-sectional view in a section A-A of the plug holder 2 which is illustrated in plan view in FIG. 3. FIG. 1 shows a plug part 1 in the same lateral cross section.

The plug part 1 has a holding section 5 which is intended to be fitted into the plug holder 2. Above the holding section 5, the plug part 1 has a collar 9 which is formed circumferentially around the holding region 5 and is substantially in the form of a disk. A circumferential sealing bead 10 is provided on that side of the collar 9 which faces the plug holder 2. Following the sealing bead 10, a recessed section 8 of the collar 9 is formed around the holding region 5. A specific section of the sealing bead 10 interacts with an opposite sealing surface 11 of the plug holder 2 as an overpressure prevention region 7. A cutout 12 is provided on that side of the collar 9 which is averted from the plug part 2, and therefore the sealed off housing space, in the region of the overpressure prevention region 7. The cutout 12 reduces the material thickness of the collar 9 is this region, and therefore a point 13 of increased flexibility is produced. Consequently, the collar 9 can be deformed by the gas pressure produced in the recess 8 more easily in the region of the overpressure prevention region 7 than the other sections of the collar 9. Gas can be discharged from the housing by virtue of deformation of the collar 9 in the overpressure prevention region 7.

The holding region 5 of the plug part 1 is intended to be inserted into a hollow region 4 of the plug holder 2. The hollow region 4 has a plurality of ribs 16 which are arranged on the inner face of the plug holder 2 and between which flow channels 6 are formed. The ribs 16 have protruding centering elements 14 which run in the longitudinal direction of the plug holder 2 and are in the form of guide ribs by means of which the holding region 5 of the plug part 1 is centered in the plug holder 2. The effective inside diameter, which is formed by the centering elements 14, of the hollow region 4 is somewhat larger than the outside diameter of the holding section 5. As a result, the plug part 1 is fitted in the plug holder 2 with a certain amount of play.

In a housing space 3, gas which is under overpressure can be routed to the recess 8 via the flow channels 6 in the arrangement illustrated in FIGS. 1 to 3 and, given an appropriate overpressure, cause deformation of the collar 9 in the region of the cutout 12 and consequently opening of the seal in the overpressure prevention region 7. This results in the function of overpressure prevention. In addition, when the plug part 1 is inserted into the plug holder 2, the sealing bead 10 rests against the sealing face 11 of the plug holder 2. This seals off the housing opening 3 and therefore the interior of the housing from the external surrounding area.

FIG. 5 shows a plan view of the plug part 1. FIG. 4 illustrates the plug part 1 in a lateral cross section B-B. As can be seen in FIG. 5 in particular, the cutout 12 has a contour in the form of part of a circle. Other contours can also be advantageously realized, for example an elliptical shape or a uniform reduction in the material thickness in the direction of the outer contour of the collar 9.

As can be seen in FIG. 4, a punch 15 is provided on that side of the plug part 1 which is averted from the holding region 5, it being possible for said punch to be of, for example, hemispherical or cylindrical configuration. The function of the punch 15 will be discussed later.

FIG. 6 shows a plug accommodation element 60. The plug accommodation element 60 has an inner chamber 65 which is intended to accommodate the plug part 1. The plug accommodation element 60 has a housing region 62 which extends around the circumference of the plug holder 2 and extends at least over a certain section of the plug holder 2 in the longitudinal direction of the plug holder 2. The housing section 62 has a holding means 64 in order to be fastened to a housing. The holding means 64 is designed, for example, as a thread. An upper sealing element 61 and a lower sealing element are provided on the outer region of the plug accommodation element 60. The sealing elements 61, 68 can be designed as circumferential sealing rings, for example as O-rings. In one advantageous refinement, the sealing rings 61, 68 are connected to one another by means of a connecting piece 63. As a result, an integral sealing arrangement comprising the sealing rings 61, 68 and the connecting element 63 can be produced, for example from an elastomeric material.

The plug accommodation element 60 also has a gas outlet point 67 by means of which the gas emerging from the housing opening 3 via the overpressure prevention region 7 can be dissipated. The gas outlet point 67 issues, for example, into a gas collection channel which, in the case of a lead-acid battery, leads to a central gas outlet point of the battery at which, for example, an explosion protection frit can be provided.

As can be seen in FIG. 6, the plug part 1 is arranged in the plug holder 2 in such a way that the sealing bead 10 rests against the sealing surface 11. In order to prevent the plug part 1 from shifting in the longitudinal direction (axial direction), the plug accommodation element 60 has a mating bearing device 69 which comes into contact with the plug part, specifically with the punch 15 in the exemplary embodiment according to FIG. 6. As a result, the plug part 1 is fixed in the longitudinal direction. The seal, which is created by the sealing bead 10 and the sealing surface 11, can be held under a certain, desired prestress by suitably matching the dimensions of the punch 15 and the mating bearing device 69, and as a result the desired sealing action can be achieved. The prestress is advantageously set in such a way that the overpressure prevention function responds when there is a predetermined overpressure in the housing interior, and opens a gas flow path.

FIG. 7 shows a perspective illustration of a further embodiment of the plug part 1. The embodiment according to FIG. 7 has a substantially cylindrical punch 15. On account of the cylindrical shaping of the punch 15, the introduction of force from the mating bearing device 69 to the plug part 1 can be improved since the spring force characteristic curve is linearized in comparison to the rounded shaping according to FIG. 4. In addition, any remaining (plastic) deformation of the punch 15 as a result of settling of the material is reduced in comparison to the rounded shaping.

In addition, the cutout 12 has a substantially linear contour, that is to say an approximately straight line, when the plug part 1 is viewed from above. Furthermore, the holding section 5 has a conically shaped section 70 which faces the end of the holding section 5. The conical section 70 serves as an insertion bevel and makes it easier to insert the plug part 1 into the hollow region 4 of the plug holder, 2.

FIG. 8 finally shows a use of the above-described arrangement having the plug accommodation element 60, the plug part 1 and the plug holder 2. Said figure illustrates a detail of a housing 71 of a rechargeable battery, with a rechargeable battery cell being shown by way of example. The housing 71 has a housing body 75 and a cover 72. A housing space 74 is provided in an interior 73, 74, said housing space serving to accommodate liquid. A gas space is provided in an upper housing space 73. Gas emerging via the housing space 3 enters a central gas collection channel 76 which leads to the mentioned central gas outlet point of the rechargeable battery. The housing 71 illustrated in FIG. 8 can advantageously be the housing of a rechargeable battery, for example a lead-acid battery.

The invention claimed is:

1. A sealing plug arrangement (1, 2) for a rechargeable battery, with the sealing plug arrangement having at least a plug part (1) and a plug holder (2), the plug holder (2) having a hollow region (4) for accommodating at least one holding section (5) of the plug part (1), with the plug part (1) being designed to seal off at least one interior (73, 74) of the rechargeable battery from the surrounding area when said plug part is fitted in the hollow region (4) of the plug holder (2), characterized in that the plug holder (2) has at least one flow channel (6) on its inner circumferential surface in the hollow region (4), said flow channel being arranged between the outer circumferential surface of the at least one holding section (5) of the plug part (1) and the inner circumferential surface of the plug holder (2) and extending at least along that region in which the plug part (1) is held in the plug holder (2) when said plug part is fitted in the hollow region (4) wherein the plug part (1) has a cutout (12) on its upper face in the region of an overpressure prevention region (7), opposite from the holding section (5).

2. The sealing plug arrangement as claimed in claim 1, characterized in that the flow channel (6) extends as far as the overpressure safety region (7).

3. The sealing plug arrangement as claimed in claim 1 or 2, characterized in that the plug part (1) has a collar (9) which forms a stop when the plug part (1) is inserted into the plug holder (2).

4. The sealing plug arrangement as claimed in claim 3, characterized in that the collar (9) has a sealing bead (10) which faces in the direction of the plug holder (2) when the plug part (1) is inserted into the plug holder (2), the intention being for said sealing bead to butt against a sealing surface (11) of the plug holder (2).

5. The sealing plug arrangement as claimed in claim 1, characterized in that the cutout (12) has a substantially linear contour or a contour which is substantially in the form of part of a circle when the plug part (1) is viewed from above.

6. The sealing plug arrangement as claimed in claim 1, characterized in that the plug part (1) has a point (13) of increased flexibility in the region of the overpressure prevention region (7).

7. The sealing plug arrangement as claimed in claim 1, characterized in that the plug part (1) is composed at least partly of elastomeric material.

8. The sealing plug arrangement as claimed in claim 1, characterized in that the plug holder (2) has a plurality of flow channels (6) on its inner face in the hollow region (4).

9. The sealing plug arrangement as claimed in claim 1, characterized in that the effective inside diameter of the hollow region (4) is larger than the outside diameter of the holding section (5).

10. The sealing plug arrangement as claimed in claim 1, characterized in that the plug holder (2) has protruding centering elements (14), which are arranged on ribs (16) which are formed between the flow channels (6), on its inner face in the hollow region (4).

11. The sealing plug arrangement as claimed in claim 1, characterized in that a mating bearing device (69) is provided, said mating bearing device fixing the plug part (1) in its position relative to the plug holder (2) in the axial direction in the state in which said plug part is mounted on the plug holder (2).

12. The sealing plug arrangement as claimed in claim 1, characterized in that a plug accommodation element (60) is provided, said plug accommodation element having an inner chamber (65) for accommodating the plug part (1) and the plug holder (2), and being provided with a holding means (64) in order to be fastened to the housing (71).

13. The sealing plug arrangement as claimed in claim 12, characterized in that the plug accommodation element (60) has the mating bearing device (69).

14. A rechargeable battery having a sealing plug arrangement (1, 2) as claimed in claim 1.

* * * * *